(12) United States Patent
Kobayashi

(10) Patent No.: US 9,967,426 B2
(45) Date of Patent: May 8, 2018

(54) INFORMATION DISTRIBUTION SYSTEM, INFORMATION PROCESSING DEVICE, AND INFORMATION DISTRIBUTION METHOD

(71) Applicant: Hiroto Kobayashi, Saitama (JP)

(72) Inventor: Hiroto Kobayashi, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 51 days.

(21) Appl. No.: 15/254,261

(22) Filed: Sep. 1, 2016

(65) Prior Publication Data

US 2017/0078520 A1    Mar. 16, 2017

(30) Foreign Application Priority Data

Sep. 10, 2015   (JP) ................................. 2015-178837

(51) Int. Cl.
| | | |
|---|---|---|
| *H04N 1/32* | (2006.01) | |
| *H04N 1/00* | (2006.01) | |
| *G06F 3/12* | (2006.01) | |

(52) U.S. Cl.
CPC ....... *H04N 1/32529* (2013.01); *G06F 3/1204* (2013.01); *G06F 3/1206* (2013.01); *G06F 3/1245* (2013.01); *G06F 3/1247* (2013.01); *G06F 3/1285* (2013.01); *H04N 1/00307* (2013.01); *G06F 3/1228* (2013.01); *G06F 3/1248* (2013.01); *G06F 3/1288* (2013.01); *G06F 3/1292* (2013.01)

(58) Field of Classification Search
None
See application file for complete search history.

(56) References Cited

U.S. PATENT DOCUMENTS

| | | | | |
|---|---|---|---|---|
| 9,547,461 | B2* | 1/2017 | Kobayashi | G06F 3/1204 |
| 2002/0135797 | A1* | 9/2002 | Al-Kazily | G06F 3/1203 358/1.15 |
| 2003/0174360 | A1* | 9/2003 | Ohshima | G06F 3/1203 358/1.15 |
| 2005/0229104 | A1* | 10/2005 | Franco | G06F 9/44526 715/743 |

(Continued)

FOREIGN PATENT DOCUMENTS

| | | |
|---|---|---|
| JP | 11-007521 | 1/1999 |
| JP | 2013-186824 | 9/2013 |
| JP | 2015-187837 | 10/2015 |

*Primary Examiner* — Miya J Wiiliams
(74) *Attorney, Agent, or Firm* — Oblon, McClelland, Maier & Neustadt, L.L.P.

(57) ABSTRACT

An information distribution system includes a reception unit to receive first data from an application; plug-ins respectively corresponding to types of the devices; a determination unit to determine, for each of one or more devices specified by one or more pieces of selected address specification information, whether the first data relates to the first data which is a conversion source of one or more pieces of second data having been transmitted; and a distribution unit to transmit, to the devices using the plug-ins, the one or more pieces of second data each obtained by conversion into a data format specified by the data format information a and information for identifying whether the first data which is a conversion source of the one or more pieces of second data relates to the first data which is the conversion source of the one or more pieces of second data having been transmitted.

14 Claims, 14 Drawing Sheets

(56) References Cited

U.S. PATENT DOCUMENTS

| | | | |
|---|---|---|---|
| 2010/0110476 A1* | 5/2010 | Gorgenyi | G06F 3/121 358/1.15 |
| 2010/0188687 A1* | 7/2010 | Fukano | G06F 3/1204 358/1.15 |
| 2010/0250738 A1* | 9/2010 | Nagatani | H04L 41/0806 709/224 |
| 2010/0302589 A1 | 12/2010 | Kobayashi | |
| 2011/0051188 A1* | 3/2011 | Yoda | G06F 3/1203 358/1.15 |
| 2011/0058199 A1 | 3/2011 | Kobayashi | |
| 2011/0286036 A1 | 11/2011 | Kobayashi | |
| 2012/0140269 A1 | 6/2012 | Kobayashi | |
| 2012/0236346 A1* | 9/2012 | Miyabe | G06F 9/4411 358/1.13 |
| 2012/0327463 A1* | 12/2012 | Mizuno | G06F 3/122 358/1.15 |
| 2013/0044335 A1 | 2/2013 | Kobayashi | |
| 2013/0094056 A1 | 4/2013 | Kobayashi | |
| 2013/0169987 A1* | 7/2013 | Akiyama | G06F 9/44505 358/1.13 |
| 2013/0235422 A1 | 9/2013 | Nakata | |
| 2013/0250331 A1 | 9/2013 | Kobayashi | |
| 2014/0063522 A1 | 3/2014 | Kobayashi | |
| 2015/0254026 A1 | 9/2015 | Kobayashi et al. | |
| 2016/0162227 A1* | 6/2016 | Kato | G06F 3/1227 358/1.13 |

\* cited by examiner

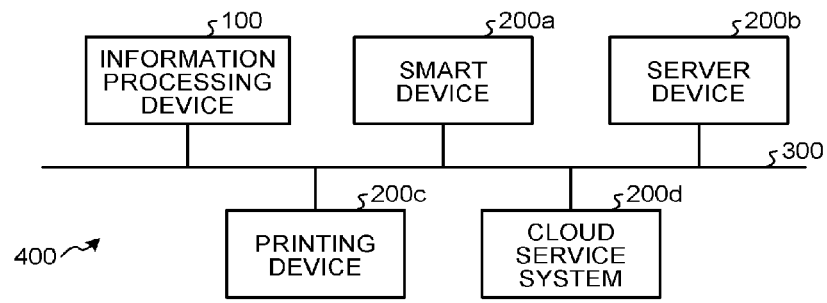
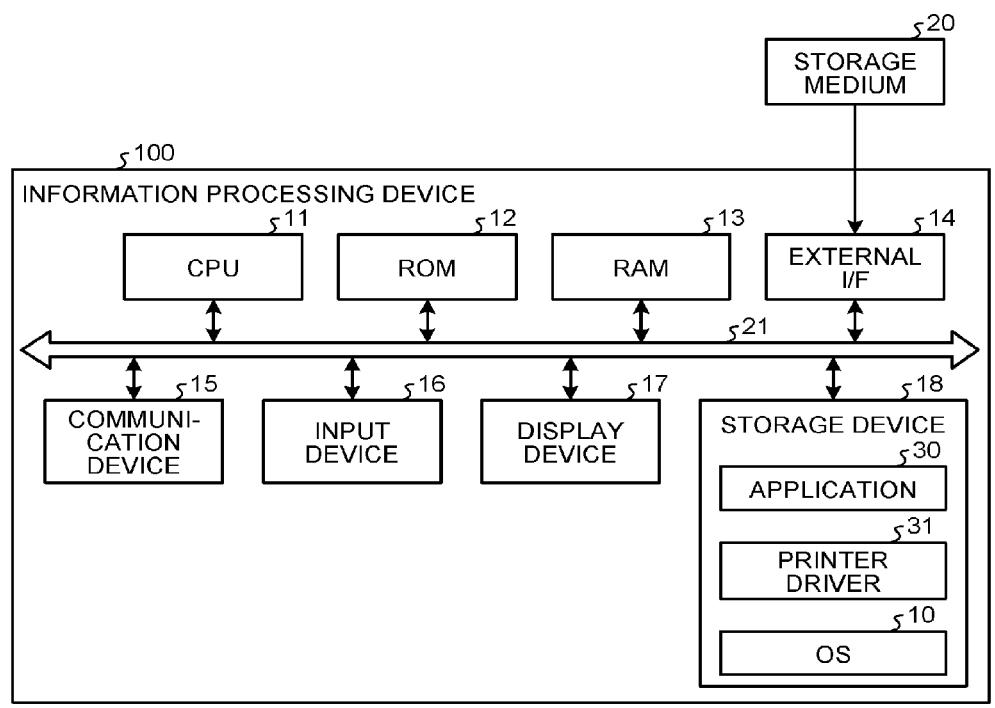

FIG.6

| ID | NAME | ADDRESS |
|---|---|---|
| 000A1 | A'S TABLET | 123.456.789.XXX |
| 000A2 | B'S SMARTPHONE | 123.456.789.YYY |
| 000A3 | C'S SMARTPHONE | 123.456.789.ZZZ |

FIG.7

| | NAME | STATE |
|---|---|---|
| PLUG-IN A | CONFERENCE SYSTEM | VALID |
| PLUG-IN B | SMART DEVICE | VALID |
| PLUG-IN C | PRINTING DEVICE | INVALID |

FIG.8

SELECTION OF TRANSMISSION DESTINATION DEVICE

PLEASE SELECT DEVICE TO WHICH
YOU WANT TO TRANSMIT DATA

| SMART DEVICE | ∨ |
| CONFERENCE SYSTEM | |

[NEXT] [CANCEL]

FIG.9

SELECTION OF TRANSMISSION DESTINATION

PLEASE SELECT TRANSMISSION DESTINATION

| ID | NAME | TRANSMIT |
|---|---|---|
| 000A1 | A'S TABLET | ☑ |
| 000A2 | B'S SMARTPHONE | ☑ |
| 000A3 | C'S SMARTPHONE | ☑ |

[TRANSMIT] [CANCEL]

| No | NAME | VALID/INVALID | SETTING |
|---|---|---|---|
| 1 | SMART DEVICE | ☑ | SET |
| 2 | CONFERENCE SYSTEM | ☑ | SET |
| 3 | CLOUD SERVICE SYSTEM | ☐ | SET |

MANAGEMENT OF TRANSMISSION DESTINATION DEVICES

ADD TRANSMISSION DESTINATION DEVICE | OK | CANCEL

JOB NAME: SPECIFICATION.doc
APPLICATION NAME: APPLICATION A
TRANSMISSION DATE AND TIME: 2015/02/03 8:50
VERSION: 1.0
REGISTRATION INFORMATION: NEW REGISTRATION

INFORMATION DISTRIBUTION SYSTEM, INFORMATION PROCESSING DEVICE, AND INFORMATION DISTRIBUTION METHOD

CROSS-REFERENCE TO RELATED APPLICATIONS

The present application claims priority under 35 U.S.C. § 119 to Japanese Patent Application No. 2015-178837, filed on Sep. 10, 2015. The contents of which are incorporated herein by reference in their entirety.

BACKGROUND OF THE INVENTION

1. Field of the Invention

The present invention relates to an information distribution system, an information processing device, and an information distribution method.

2. Description of the Related Art

Normally, printer drivers have roles of converting print data received from an application into a data format capable of being printed by a printer and transmitting the converted data to the printer. In recent years, some printer drivers (digitizing drivers) convert print data received from an application into an image data (image file) format. Examples of the image data format into which the print data is converted include a PDF format, an XPS format, a TIFF format, and a JPEG format.

Japanese Unexamined Patent Application Publication No. 2013-186824 discloses the following invention. When converting document data created by an application into image data, a printer driver adds an identification ID to the image data and stores the resultant data in a storage, so as to improve retrievability of the image data.

The conventional technique however cannot transmit the data to various devices including a printer by a unified operation with a printing operation without causing a user to be conscious of a usable data format and manage a version of the data. For example, when the data is modified, the data before being modified and the data after being modified are separately registered in a transmission destination device, resulting in complicated management of the pieces of data stored in the device.

SUMMARY OF THE INVENTION

According to one aspect of the present invention, an information distribution system distributes information to devices of a plurality of types. The information distribution system includes a reception unit, a plurality of plug-ins, an acquisition unit, a display control unit, a determination unit, and a distribution unit. The reception unit receives first data from an application. The plurality of plug-ins respectively correspond to the plurality of types of the devices. The plurality of plug-ins control storage of data format information indicating one or more data formats capable of being used by the devices and storage of one or more pieces of address specification information indicating addresses of the devices, and transmits, to one or more devices, one or more pieces of second data obtained by converting a data format of the first data. The acquisition unit acquires, from one or more of the plug-ins, the address specification information and the data format information. The display control unit performs control to display, on a display device, a selection screen for receiving selection of one or more pieces of address specification information from among the one or more pieces of address specification information acquired by the acquisition unit. The determination unit determines, for each of the one or more devices specified by the one or more pieces of selected address specification information, whether the first data relates to the first data which is a conversion source of the one or more pieces of second data that have been already transmitted. The distribution unit transmits the one or more pieces of second data each obtained by conversion into a data format specified by the data format information acquired by the acquisition unit and information for identifying whether the first data which is a conversion source of the one or more pieces of second data relates to the first data which is the conversion source of the one or more pieces of second data that have been already transmitted to the one or more devices specified by the one or more pieces of address specification information received through the selection screen using the plug-ins.

BRIEF DESCRIPTION OF THE DRAWINGS

FIG. 1 is a diagram illustrating an example of the configuration of an information distribution system according to a first embodiment;

FIG. 2 is a diagram illustrating an example of the hardware configuration of an information processing device in the first embodiment;

FIG. 6 is a diagram illustrating an example of pieces of address specification information of a plug-in B in the first embodiment;

FIG. 7 is a diagram illustrating an example of plug-in information in the first embodiment;

FIG. 8 is a diagram illustrating an example of a selection screen of a type of a transmission destination device in the first embodiment;

FIG. 9 is a diagram illustrating an example of a selection screen of the transmission destination device in the first embodiment;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 3:
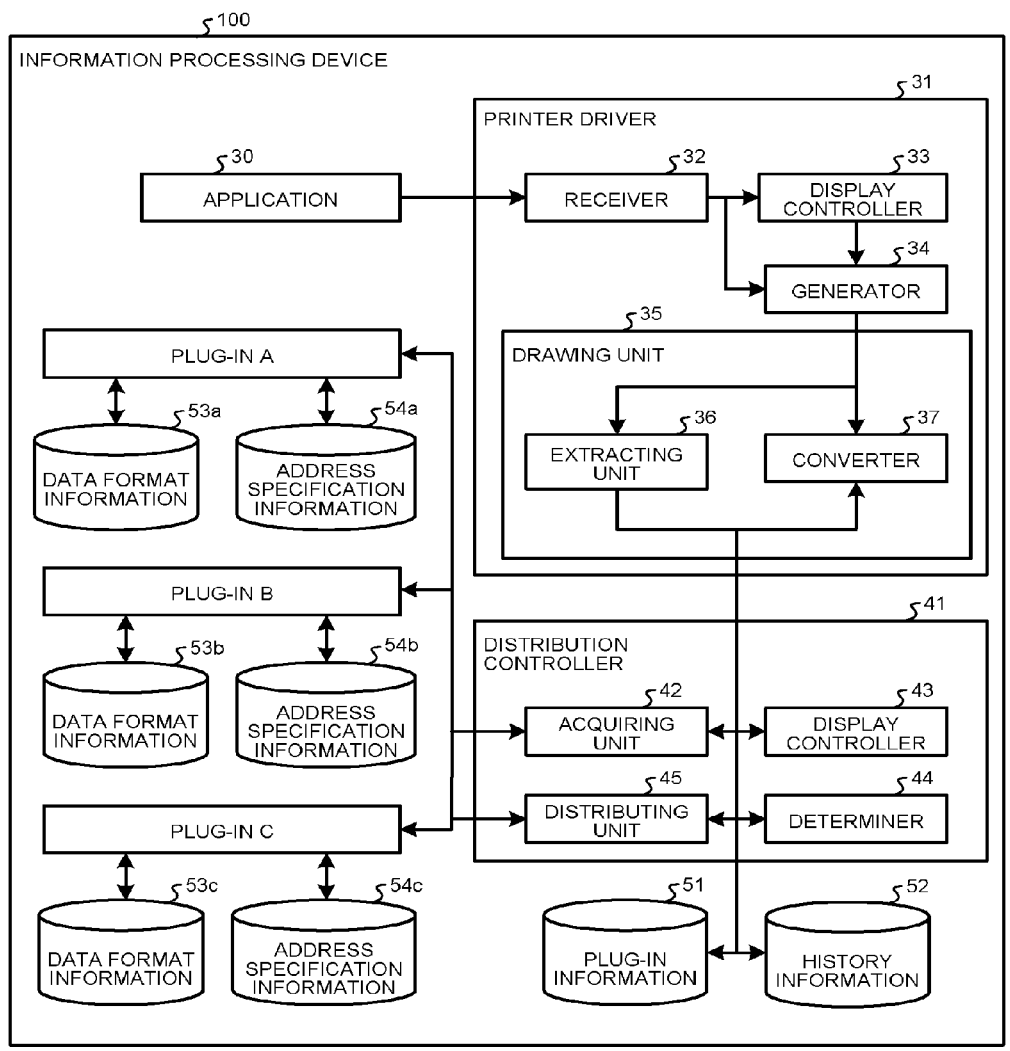
FIG. 3 is a diagram illustrating an example of functional blocks of the information processing device in the first embodiment.

The terminology used herein is for the purpose of describing particular embodiments only and is not intended to be limiting of the present invention.

As used herein, the singular forms "a", an and the are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide an information distribution system capable of transmitting data to various devices including a printer by a unified operation with a printing operation without causing a user to be conscious of a usable data format and managing a version of the data.

Hereinafter, embodiments will be described in detail with reference to the accompanying drawings.

First Embodiment

First, the configuration of an information distribution system according to a first embodiment will be described. FIG. 1 is a diagram illustrating an example of the configuration of an information distribution system 400 in the first embodiment. The information distribution system 400 in the first embodiment includes an information processing device 100, a smart device 200a, a server device 200b, a printing device 200c, and a cloud service system 200d. The information processing device 100, the smart device 200a, the server device 200b, the printing device 200c, and the cloud service system 200d are coupled to one another via a network 300. In the information distribution system 400 in the first embodiment, the information processing device 100 transmits data (for example, image data) to the respective devices (the smart device 200a, the server device 200b, the printing device 200c, and the cloud service system 200d) via the network 300. Hereinafter, when types of the devices are not distinguished from one another, they are simply referred to as a device 200.

Specific examples of the respective devices in FIG. 1 will be described. The information processing device 100 is a personal computer or the like. The smart device 200a is a smartphone, a tablet terminal, or the like. The server device 200b is a device on which pieces of electronic data (image data and the like) to be referred in a conference system or the like established by a plurality of terminals are uploaded. The printing device 200c is a printer, a multi function printer (MFP), or the like. The cloud service system 200d is a system providing service using the uploaded pieces of electronic data on the Internet. The cloud service system 200d is DropBox (registered trademark) or SkyDrive (registered trademark), for example.

Next, the hardware configuration of the information processing device 100 in the first embodiment will be described. FIG. 2 is a diagram illustrating an example of the hardware configuration of the information processing device 100 in the first embodiment. The information processing device 100 in the first embodiment includes a central processing unit (CPU) 11, a read only memory (ROM) 12, a random access memory (RAM) 13, an external interface (I/F) 14, a communication device 15, an input device 16, a display device 17, and a storage device 18. The CPU 11, the ROM 12, the RAM 13, the external I/F 14, the communication device 15, the input device 16, the display device 17, and the storage device 18 are connected to one another via a bus 21.

The CPU 11 is a device controlling operations of the information processing device 100. The ROM 12 is a read-only nonvolatile storage medium. The ROM 12 stores therein a computer program such as firmware. The RAM 13 is a volatile storage medium from and into which information is readable and writable at high speed. The RAM 13 is used as a work region when the CPU 11 processes information. The external I/F 14 is an interface for connecting an external device such as a storage medium 20 to the bus 21. The communication device 15 communicates with the other devices 200 via the network 300. The input device 16 is a user interface enabling the user to input information to the information processing device 100. The input device 16 is a keyboard and a mouse, for example. The display device 17 is a visual user interface enabling the user to check a state of the information processing device 100. The display device 17 is a liquid crystal display (LCD), for example. The storage device 18 is a nonvolatile storage medium from and into which information is readable and writable.

The storage device 18 stores therein an operating system (OS) 10, an application 30, a printer driver 31, and the like. The OS 10 is a computer program controlling the entire system of the information processing device 100. The application 30 is a computer program operating with the OS 10 and performs predetermined processing. The application 30 is document creation software or spreadsheet software, for example. The printer driver (digitizing driver) 31 converts printing (digitization) target data into a data format for printing or a data format capable of being used by a transmission destination device. Hereinafter, the printing (digitization) target data is referred to as first data. Data that is formed based on the first data is referred to as second data. To be specific, the second data is data formed by converting the first data into the data format for printing or the data format capable of being used by the transmission destination device. The printer driver (digitizing driver) 31 will be described in detail later with reference to FIG. 3.

Next, the functional blocks of the information processing device 100 in the first embodiment will be described. FIG. 3 is a diagram illustrating an example of the functional blocks of the information processing device 100 in the first embodiment. The information processing device 100 in the first embodiment includes the application 30, the printer driver 31, a distribution controller 41, and plug-ins (a plug-in A, a plug-in B, and a plug-in C). The printer driver 31 includes a receiver 32, a display controller 33, a generator 34, and a drawing unit 35. The drawing unit 35 includes an extracting unit 36 and a converter 37.

Furthermore, the information processing device 100 stores therein plug-in information 51, history information 52, pieces of data format information 53a to 53c, and pieces of address specification information 54a to 54c. Hereinafter, when the pieces of data format information 53a to 53c are not distinguished from one another, they are simply referred to as data format information 53. In the same manner, when the pieces of address specification information 54a to 54c are not distinguished from one another, they are simply referred to as address specification information 54. The distribution controller 41 in the first embodiment is provided as a computer program just as the application 30 and the printer driver 31. The plug-in A, the plug-in B, and the plug-in C are computer programs capable of being added to or deleted from the information processing device 100.

The application 30 transmits a printing (digitization) request indicating a request for printing (digitization) processing to the receiver 32 of the printer driver 31. The receiver 32 receives the printing (digitization) requests from various applications 30. The printing (digitization) request contains the first data which is a target of the printing (digitization) processing. The first data is data contained in application data that the application 30 opens. The printing (digitization) request is generated when printing is selected from a menu of a UI of the application 30, for example. When the receiver 32 receives the printing (digitization) request from the application 30, it inputs the printing (digitization) request to the display controller 33 and the generator 34. When the display controller 33 receives the printing (digitization) request from the receiver 32, it causes display of a printing (digitization) setting screen on the display device 17.

Figure 4:
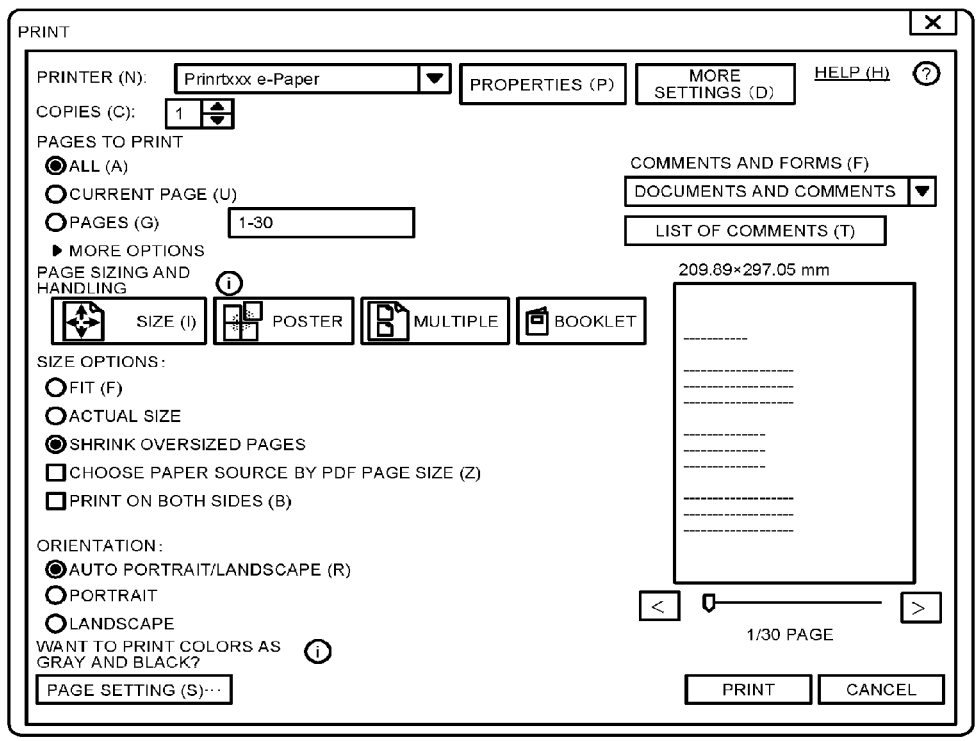
FIG. 4 is a diagram illustrating an example of a printing (digitization) setting screen in the first embodiment.

FIG. 4 is a diagram illustrating an example of the printing (digitization) setting screen in the first embodiment. The display controller 33 receives, from a user, input indicating specifications of printing (digitization) settings including selection of color or monochrome, paper orientation, resolution, the number of copies, both-sided printing, aggregate printing, bookbinding, and magnification through the printing (digitization) setting screen. The specifications of the printing (digitization) settings are placed by pressing a print button.

Referring back to FIG. 3, the display controller 33 inputs, to the generator 34, printing setting data indicating the printing settings specified by the user through the printing (digitization) setting screen. The generator 34 receives the first data from the receiver 32 and receives the printing setting data from the display controller 33. The generator 34 generates a job for printing (digitizing) the first data based on the printing setting data. The job contains the first data, the printing setting data, a job name, a user name, and an application name. The job name is a name of the job. The job name is specified by the printing (digitization) request that the receiver 32 has received from the application 30. The job name contains a name of the application data, for example. The user name is a name of the user of the application 30. The application name is a name of the application 30 as a transmission source of the printing (digitization) request. The generator 34 inputs the job to the extracting unit 36 and the converter 37.

When the extracting unit 36 receives a job from the generator 34, it extracts characteristic information indicating characteristics of the first data contained in the job based on the printing setting data contained in the job. The characteristic information is, for example, the total number of pages of the first data and drawing object information contained in the first data. The drawing object information is information specifying drawing objects. The drawing object information is the number, the types, the positions, characteristics, and the like of the drawing objects, for example. The types of the drawing objects are a character, a figure, and an image, for example.

Figure 5:
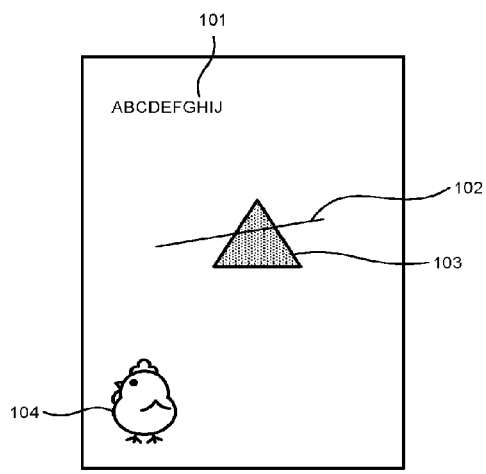
FIG. 5 is a diagram illustrating an example of drawing objects in the first embodiment.

FIG. 5 is a diagram illustrating an example of the drawing objects in the first embodiment. In the example of FIG. 5, a printing (digitization) target page contained in the first data includes a character string 101, a FIG. 102, a FIG. 103, and an image 104 as the drawing objects.

The coordinates indicating the position of the character string 101 in the printing (digitization) target page are (100, 100). Characteristics of the character string 101 are contents "ABCDEFGHIJ" of the character string, a color of characters, a font of the characters, and a script type of the characters, for example.

The coordinates indicating the position of the FIG. 102 in the printing (digitization) target page are (800, 1500). The coordinates indicating the position of the FIG. 103 in the printing (digitization) target page are (1000, 1800). Characteristics of the FIG. 102 and the FIG. 103 are lines, passes, painted colors, and overlapping colors, for example.

The coordinates indicating the position of the image 104 in the printing (digitization) target page are (100, 4000). Characteristics of the image 104 are the width of the image, the height of the image, and the number of colors of the image, for example.

Referring back to FIG. 3, the extracting unit 36 transmits the job and the characteristic information of the first data to a determiner 44 of the distribution controller 41. The extracting unit 36 is included in the drawing unit 35 of the printer driver 31 because it is preferable that the characteristic information of the first data be extracted before the first data is converted into the second data. The second data is electronic data in such a data format as a PDF format, an XPS format, a TIFF format, a JPEG format, or the like. It is therefore difficult to extract the characteristic information from the second data. It should be noted that the characteristic information indicating the characteristics of the first data and characteristic information indicating the characteristics of the second data are the same because the second data is data formed by converting the data format of the first data.

Then, operations of the converter 37 will be described. When the converter 37 receives the job from the generator 34, it inquires at an acquiring unit 42 of the distribution controller 41 about the data format information 53. The data format information 53 indicates one or more data formats capable of being used by the transmission destination devices. Any data format may be stored as the data format information 53. Hereinafter, in the description of the first embodiment, the data format that is stored as the data format information 53 is assumed to be the data format of image data, such as the PDF format, the XPS format, the TIFF format, and the JPEG format.

The plug-in controls storage of the data format information 53. The plug-in is described herein. The plug-in in the first embodiment is installed in the information processing device 100 for each type of the transmission destination devices for the second data. The plug-in is installed as described above so as to be added to or deleted from the information processing device 100 by executing transmission processing of the second data with the plug-in for each type of the transmission destination devices because transfer protocols and usable data formats are different among the types of the transmission destination devices. With the above, even when a device of a new type appears, the second data formed based on the first data can be transmitted to the device by a unified operation with the printing operation only by adding a plug-in corresponding to the device to the information processing device 100. As the data format information 53, resolution of the second data, minimum sizes and maximum sizes of the length and the width of the second data, and the like may be stored in addition to the data format of the second data.

Furthermore, the plug-in controls storage of one or more pieces of address specification information 54 in addition to the data format information 53. FIG. 6 is a diagram illustrating an example of the pieces of address specification information 54b of the plug-in B in the first embodiment. In the example of FIG. 6, the address specification information 54b contains an ID, a name, and an address. The ID is an identifier uniquely specifying the transmission destination device. The name is a name of the transmission destination device. The address is information specifying a location of the transmission destination device. The address is an IP address, for example. In the example of FIG. 6, the name of the transmission destination device, ID of which is specified by "000A1", is "A's tablet" and the address thereof is "123.456.789.XXX", for example.

Referring back to FIG. 3, the plug-in A, the plug-in B, and the plug-in C are installed in the information processing device 100 in the first embodiment. The number of plug-ins that are installed in the information processing device 100 is not limited to three and any number thereof may be installed. In the information processing device 100 in the first embodiment, the plug-in A is assumed to be a plug-in corresponding to a conference system, the plug-in B is assumed to be a plug-in corresponding to a smart device, and the plug-in C is assumed to be a plug-in corresponding to a printing device. Furthermore, it is assumed that the data format information 53a of the plug-in A indicates the PDF format, the data format information 53b of the plug-in B indicates the PDF format and the JPEG format, and the data format information 53c of the plug-in C indicates an EMF format.

When the acquiring unit 42 receives inquiry about the data format information 53 from the converter 37, it specifies a valid plug-in with reference to the plug-in information 51. FIG. 7 is a diagram illustrating an example of the plug-in information 51 in the first embodiment. In the example of FIG. 7, the plug-in information 51 contains a name and a state. The name is a name of the plug-in. The state indicates whether the plug-in is valid or invalid. In the example of FIG. 7, for example, the name of the plug-in A is "conference system" and the state of the plug-in A is "valid". When the plug-in information 51 is under a condition of FIG. 7, the acquiring unit 42 specifies the valid plug-ins to be the plug-in A and the plug-in B.

Subsequently, the acquiring unit 42 acquires the data format information 53 from the valid plug-in. In the example of FIG. 7, the acquiring unit 42 acquires the data format information 53a from the plug-in A and acquires the data format information 53b from the plug-in B because the valid plug-ins are the plug-in A and the plug-in B. As described above, in the information processing device 100 in the first embodiment, the data format information 53a of the plug-in A is the PDF format. The acquiring unit 42 therefore acquires information indicating the PDF format as the data format information 53a from the plug-in A. In the same manner, the data format information 53b of the plug-in B is the PDF format and the JPEG format. The acquiring unit 42 therefore acquires information indicating the PDF format and information indicating the JPEG format as the data format information 53b from the plug-in B.

Then, the acquiring unit 42 transmits the data format information 53 acquired from the valid plug-in to the converter 37 of the printer driver 31.

Subsequently, when the converter 37 receives the job from the generator 34 and receives the data format information 53 from the acquiring unit 42, it converts the first data into one or more pieces of second data in the data formats defined by the pieces of data format information 53 based on the printing setting data contained in the job. In the example of FIG. 7, the converter 37 receives the above-mentioned data format information 53a and the above-mentioned data format information 53b from the plug-in A and the plug-in B and converts the first data into the pieces of second data in the PDF format and the JPEG format. Thereafter, the converter 37 transmits the second data to a distributing unit 45.

Then, a display controller 43 requests the acquiring unit 42 to acquire the address specification information 54. The acquiring unit 42 acquires the address specification information 54 from the valid plug-in. In the example of FIG. 7, the acquiring unit 42 acquires the address specification information 54a from the plug-in A and acquires the address specification information 54b from the plug-in B because the valid plug-ins are the plug-in A and the plug-in B. The acquiring unit 42 inputs the address specification information 54 acquired from the valid plug-in to the display controller 43.

Subsequently, when the display controller 43 receives the address specification information 54 from the acquiring unit 42, it causes display of a selection screen for selecting the transmission destination device on the display device 17. FIG. 8 is a diagram illustrating an example of the selection screen of a type of the transmission destination device in the first embodiment. FIG. 9 is a diagram illustrating an example of the selection screen of the transmission destination device in the first embodiment. FIG. 8 and FIG. 9 illustrate an example of the case in which first, the type of the transmission destination device is selected on the screen in FIG. 8, and then, the addresses of the transmission destination devices of the selected type are displayed on the screen in FIG. 9. The screen in FIG. 8 is displayed after the conversion processing of the first data that is executed after the print button on the screen in FIG. 4 is pressed and the acquisition processing of the address specification information 54 that is displayed as the candidate. The example of FIG. 9 illustrates the case when the smart device has been selected as the type of the transmission destination device on the selection screen in FIG. 8. The display controller 43 may cause display of all the transmission destination devices as the destination candidates at a time without hierarchizing the display of the destinations as in the examples of FIG. 8 and FIG. 9.

Referring back to FIG. 3, the display controller 43 inputs the address specification information 54 selected by the user through the screens in FIG. 8 and FIG. 9 to the determiner 44.

The determiner 44 receives the above-mentioned job and characteristic information from the extracting unit 36 and receives the selected address specification information 54 from the display controller 43. The determiner 44 determines, based on the history information 52, whether the first data characterized by the characteristic information relates to first data which is a conversion source of one or more pieces of second data that have been already transmitted to the devices specified by the pieces of address specification information 54. Furthermore, the determiner 44 determines version information of the first data based on the history information 52.

First, the history information 52 is described. The distributing unit 45 creates the history information 52 for each job generated by the generator 34. The distributing unit 45 stores the history information 52 related to the second data after it distributes the second data.

The history information 52 is stored while job specification information, characteristic information, device specification information, and version information are associated with each other.

The job specification information is information specifying a job. The job specification information contains the above-mentioned job name, the above-mentioned user name, the above-mentioned application name, and distribution date and time. The distribution date and time are date and time at which the second data based on the first data was distributed.

The characteristic information is the above-mentioned characteristic information extracted from the first data by the extracting unit 36.

The device specification information is information specifying the transmission destination device of the one or more pieces of second data obtained by converting the data format of the first data.

The version information is version information of the first data. The determiner 44 determines the version information.

The data of the history information 52 is uniquely identified by the job specification information.

Operations of the determiner 44 will be described in detail. First, the determiner 44 acquires a difference between the characteristic information that the data of the history information 52 has and the characteristic information extracted by the extracting unit 36. The difference in the characteristic information is a difference in the total number of pages of the first data and a difference in the number of drawing objects contained in the first data, for example.

Then, the determiner 44 determines whether the first data is updated first data which is as a conversion source of second data that has been already transmitted to any device using a determination criterion. Any determination criterion for determining whether to change the version information may be used. An example of the determination criterion will be described as follows.

The determiner 44 may use a first determination criterion according to which the version information of the first data is changed when the data amount (data amount indicating the difference in the characteristic information) indicating the difference between the pieces of first data is larger than 0 and is equal to or smaller than a threshold, for example. When the data amount indicating the difference between the pieces of first data is larger than the threshold, the determiner 44 determines that the first data is not the updated data and these pieces of first data are different from each other.

The determiner 44 may use a second determination criterion according to which the version information of the first data is changed when the above-mentioned application name contained in the job and the application name contained in the job specification information in the history information 52 match each other and the job name contained in the job and the job name contained in the history information 52 match each other, for example.

The determiner 44 may use a third determination criterion according to which the version information of the first data is changed when the total number of pages of the first data is increased and the number of drawing objects in the page is increased.

The determiner 44 may determine whether the version information be changed using a plurality of determination criteria. For example, the determiner 44 may change the version information when the above-mentioned second determination criterion is satisfied and the above-mentioned third determination criterion is satisfied.

Moreover, the display controller 43 may cause display of a confirmation screen for enabling the user to confirm change of the version information before the determiner 44 determines to change the version information.

Figure 10:
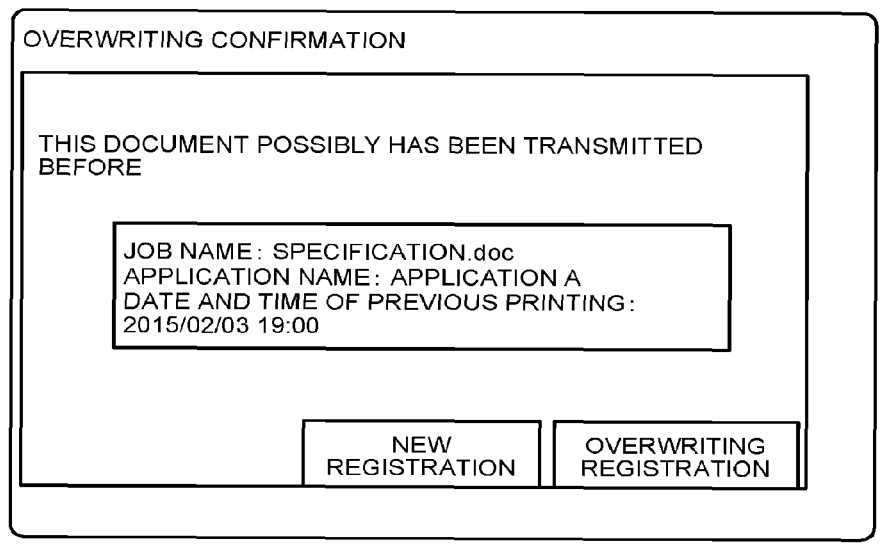
FIG. 10 is a diagram illustrating a first example of a confirmation screen in the first embodiment.

FIG. 10 is a diagram illustrating a first example of the confirmation screen in the first embodiment. The example of FIG. 10 illustrates the case in which one confirmation screen is displayed for each transmission destination device. In the example of FIG. 10, the job name (specification.doc), the application name (application A), and the date and time of previous printing (2015/02/03 19:00) are displayed. The example of FIG. 10 uses specification.doc in which a name (file name) of the application data containing the first data is used as the job name.

When a new registration button in FIG. 10 is pressed, the determiner 44 determines the version of the first data to a version when the second data based on the first data is newly registered. The version when the data is newly registered is V1.0, for example.

When an overwriting registration button in FIG. 10 is pressed, the determiner 44 determines to update the version of the first data. When the current version of the first data is V1.0, the determiner 44 updates the version to V1.1, for example.

Figure 11:
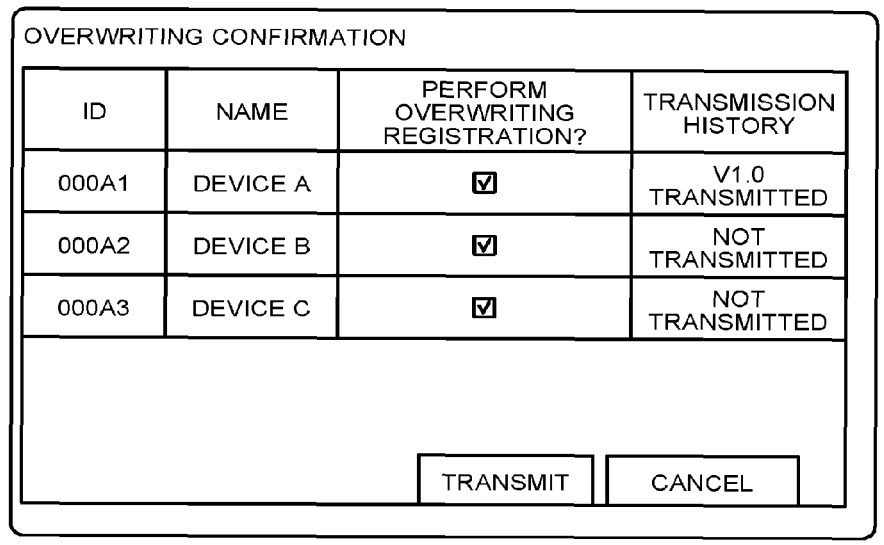
FIG. 11 is a diagram illustrating a second example of the confirmation screen in the first embodiment.

FIG. 11 is a diagram illustrating a second example of the confirmation screen in the first embodiment. The example of FIG. 11 illustrates the case in which confirmation for a plurality of transmission destination devices is made on one confirmation screen. In the example of FIG. 11, an ID, a name, a checkbox, and transmission history are displayed for each of the transmission destination devices. The ID is identification information identifying the device. The name is a name of the transmission destination device. The checkbox indicates whether overwriting registration is performed. When the checkbox is checked, it indicates to perform the overwriting registration. When the checkbox is not checked, it indicates not to perform the overwriting registration. Operation input by the user changes the state of the checkbox.

The transmission history indicates whether the second data formed by converting the data format of the first format has been already transmitted. For example, the transmission history indicates that the second data based on the first data of V1.0 has been transmitted to the device A; it also indicates, as an example, that the second data based on the first data has never been transmitted to the device B and the device C.

When a transmission button in FIG. 11 is pressed, the distributing unit 45 transmits the second data based on the first data to the respective transmission destination devices using the plug-ins corresponding to the transmission destination devices.

When a cancel button in FIG. 11 is pressed, transmission of the second data based on the first data is cancelled.

Referring back to FIG. 3, the distributing unit 45 transmits the second data based on the first data and information indicating the version of the first data to the transmission destination device selected through the selection screens in FIG. 8 and FIG. 9 using the plug-in. In this case, the distributing unit 45 may transmit other pieces of information that are used in the transmission destination device at the same time.

Figures 12, 13:
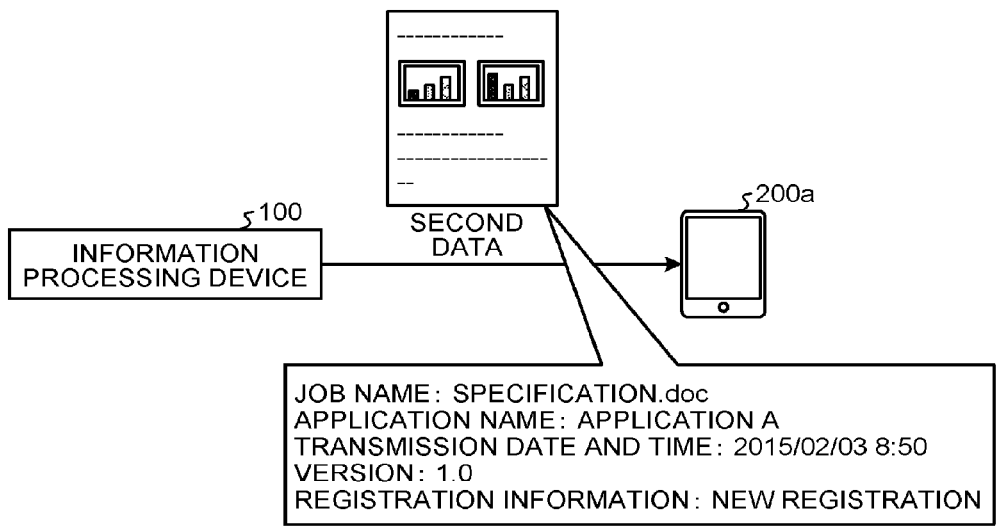
FIG. 12 is a diagram illustrating an example of a transmission destination device management screen in the first embodiment.
FIG. 13 is a diagram illustrating an example of pieces of information that are transmitted from the information processing device in the first embodiment.

FIG. 13 is a diagram illustrating an example of the pieces of information that are transmitted from the information processing device 100 in the first embodiment. In the example of FIG. 13, when the information processing device 100 transmits the second data to the smart device 200a using the plug-in B, it transmits a job name, an application name, transmission date and time, a version, and registration information. In the example of FIG. 13, the name of the application data is used as the job name. The application name indicates a name of the application that opens the application data. The transmission date and time are the date and time at which the second data was transmitted.

The registration information is information indicating the new registration or the overwriting registration. The new registration is a registration method when the first data which is the conversion source of the one or more pieces of second data is not related to first data which is a conversion source of one or more pieces of second data that have been already transmitted. The overwriting registration is a registration method when the first data which is the conversion source of the one or more pieces of second data relates to the first data which is the conversion source of the one or more pieces of second data that have been already transmitted. The registration information is identification information such as an ID, for example. For example, in the case of the new registration, the information processing device 100 (distributing unit 45) associates a new ID with the first data and transmits the ID to the smart device 200a. In the case of the overwriting registration, the information processing device 100 (distributing unit 45) transmits the existing ID associated with the second data to the smart device 200a.

When the registration information received from the information processing device 100 indicates the new registration, the smart device 200a newly registers (stores) the second data received from the information processing device 100 in a manner associated with the ID notified as the registration information. In this case, the smart device 200a may display, on a screen, reception of new data that has not been registered in the smart device 200a from the information processing device 100.

When the registration information received from the information processing device 100 indicates the overwriting registration, the smart device 200a overwrites the data in the smart device 200a that is associated with the ID notified as the registration information with the second data received from the information processing device 100. In this case, the smart device 200a may display, on the screen, reception of data, version of which has been upgraded, from the information processing device 100.

Referring back to FIG. 3, the distributing unit 45 stores the above-mentioned history information 52 for each job. To be specific, the distributing unit 45 stores the job specification information (the job name, the user name, the application name, and the distribution date and time), the characteristic information, the device specification information, and the version information associated with each other. The job name, the user name, and the application name contained in the job generated by the generator 34 are stored as the job name, the user name, and the application name. As the distribution date and time, the date and time at which the second data based on the first data has been distributed are stored. As the characteristic information, the characteristic information extracted from the first data by the extracting unit 36 is stored. As the device specification information, information specifying the device to which the second data based on the first data has been transmitted is stored. As the version information, the version determined by the determiner 44 is stored.

The user changes the above-mentioned plug-in information 51 and the pieces of information stored for the respective plug-ins A to C through a transmission destination device's management screen if needed. FIG. 12 is a diagram illustrating an example of the transmission destination device management screen in the first embodiment. The display controller 43 causes display of the transmission destination device's management screen in FIG. 12, for example, and receives settings from the user through the management screen. In the example of FIG. 12, for example, validity or invalidity of the plug-ins can be set by checkboxes for validity/invalidity. With this, the user can change the device type that is displayed on the selection screen (see FIG. 9) of the type of the transmission destination device.

When the user presses a set button in FIG. 12, a screen for changing the pieces of information stored for each plug-in is displayed and the user can change the settings through the screen. The pieces of information stored for each plug-in are the above-mentioned data format information 53 and address specification information 54, for example. When the address specification information 54 of the device 200 such as the smart device 200a having a camera function is added, a code such as a QR code (registered trademark) may be displayed on the setting screen. That is to say, the smart device 200a may acquire information for adding the address specification information 54 by image-capturing the code and transmit a processing result in accordance with the information to the information processing device 100 so as to associate the smart device 200a as the address specification information 54 in the information processing device 100.

Furthermore, the user can add a plug-in corresponding to a new device (for example, a whiteboard system) by pressing a transmission destination device addition button. This enables the second data based on the first data to be distributed to the new device without installing the printer driver 31 and the distribution controller 41 again.

Figure 14:
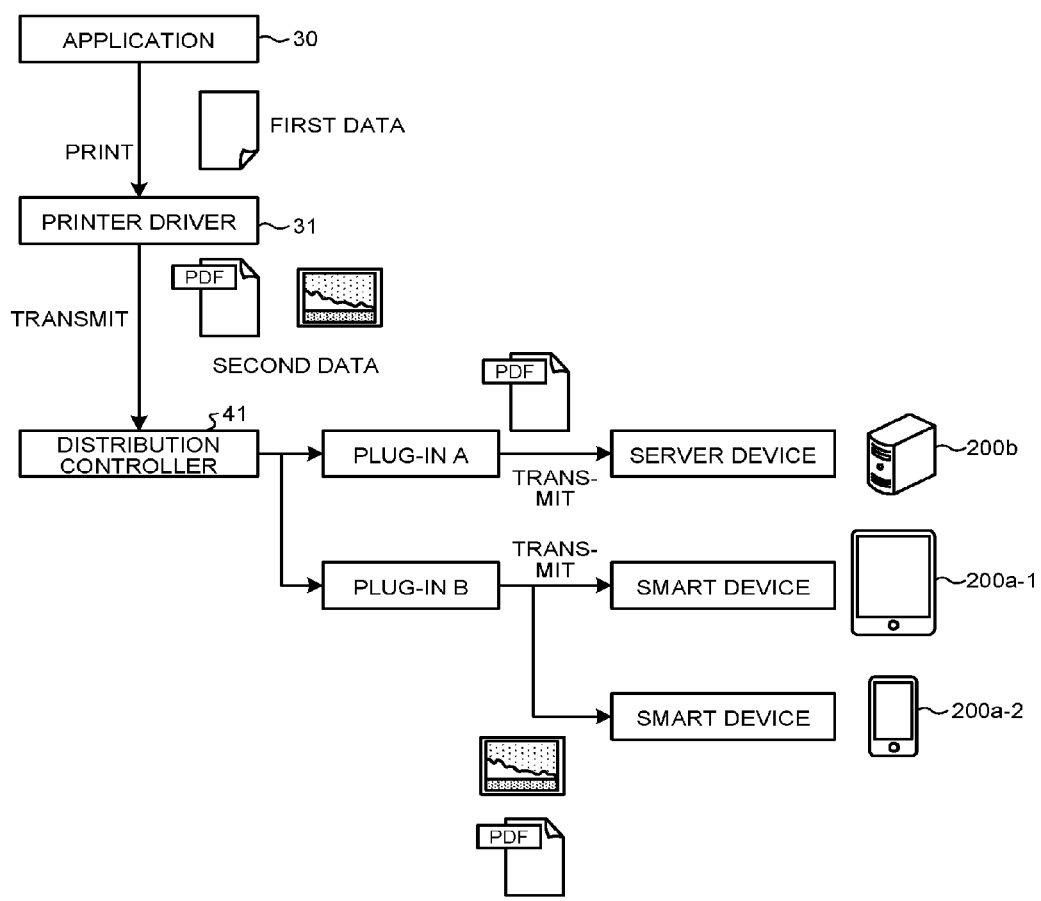
FIG. 14 is a diagram illustrating schematic data flow in an information distribution method in the first embodiment.

Next, schematic data flow in an information distribution method in the first embodiment will be described. FIG. 14 is a diagram illustrating the schematic data flow in the information distribution method in the first embodiment. The example of FIG. 14 illustrates the case in which the pieces of second data based on the first data are transmitted to a smart device 200a-1, a smart device 200a-2, and the server device 200b. First, the application 30 transmits the first data to the printer driver (digitizing driver) 31. Then, the printer driver 31 converts the first data into the pieces of second data in the PDF format and the JPEG format. The printer driver 31 transmits the pieces of second data to the distribution controller 41. The distribution controller 41 transmits the second data in the PDF format to the server device 200b using the plug-in A. In the same manner, the distribution controller 41 transmits the pieces of second data in the PDF format and the JPEG format to the smart device 200a-1 and the smart device 200a-2 using the plug-in B.

A reason why the pieces of second data in the plurality of formats (the PDF format and the JPEG format) are transmitted to the smart devices 200a for the same first data is that pieces of image data in different data formats can be used for respective portions of an image depending on applications of the smart devices 200a in some cases.

Figure 15:
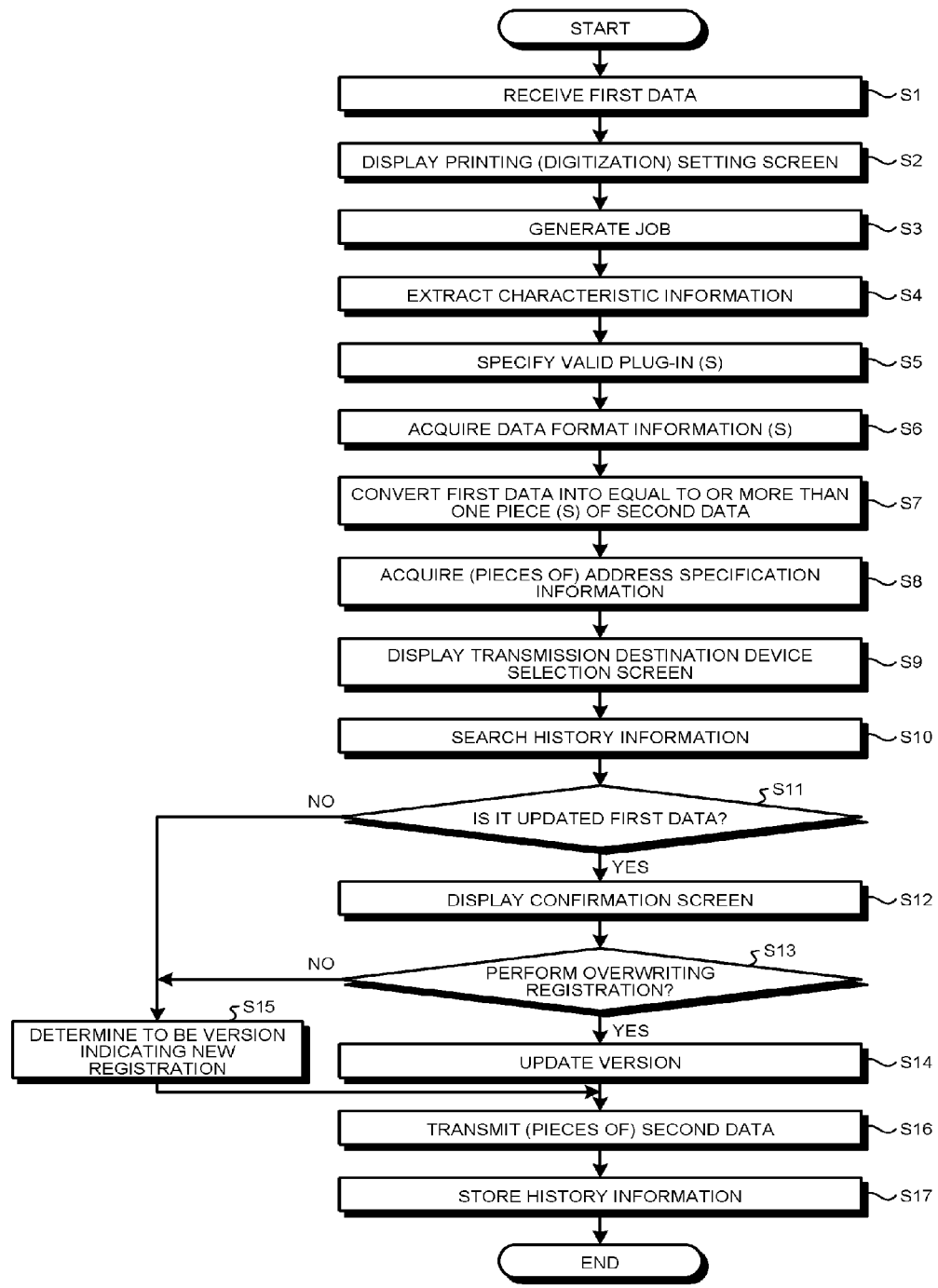
FIG. 15 is a flowchart illustrating an example of the information distribution method in the first embodiment.

Next, an example of the information distribution method in the first embodiment will be described. FIG. 15 is a flowchart illustrating an example of the information distribution method in the first embodiment. First, the receiver 32 receives the printing (digitization) request containing the first data (step S1). Then, the display controller 33 causes display of the printing (digitization) setting screen (see FIG. 4) on the display device 17 (step S2). Subsequently, the generator 34 generates a job for printing (digitizing) the first data based on the printing setting data specified by the user through the printing (digitization) setting screen (step S3).

Then, the extracting unit 36 extracts the above-mentioned characteristic information indicating the characteristics of the first data based on the printing setting data (step S4). The acquiring unit 42 specifies a valid plug-in(s) with reference to the plug-in information 51 (step S5). Thereafter, the acquiring unit 42 acquires the above-mentioned (pieces of) data format information 53 from the valid plug-in(s) (step S6). The converter 37 then converts the first data into the one or more pieces of second data in the data formats defined by the pieces of data format information 53 based on the printing setting data (step S7).

Thereafter, the acquiring unit 42 acquires the above-mentioned (pieces of) address specification information 54 from the valid plug-in(s) (step S8). Then, the display controller 43 causes display of the selection screens (see FIG. 8 and FIG. 9) for causing the user to select the transmission destination device(s) specified by the (pieces of) address specification information 54 acquired at step S8 on the display device 17 (step S9).

Subsequently, the determiner 44 searches the history information 52 for data that is used for determination based on the above-mentioned determination criterion (step S10).

The determiner 44 determines whether the first data is updated data of first data that has been already transmitted using the above-mentioned determination criterion (step S11). When the first data is not the updated first data (No at step S11), the determiner 44 determines the version of the first data to a version indicating the new registration (step S15).

When the first data is the updated first data (Yes at step S11), the display controller 43 causes display of the confirmation screen (see FIG. 10 or FIG. 11) for enabling the user to confirm change of the version information (step S12).

After that, the display controller 43 determines whether input indicating whether to transmit the (pieces of) second data based on the first data to the transmission destination device(s) by overwriting registration has been received from the user through the confirmation screen displayed at step S12 (step S13).

When the overwriting registration is performed (Yes at step S13), the determiner 44 determines that the version of the first data be updated (step S14). The determiner 44 updates the version by incrementing the version of the first data, for example.

When the overwriting registration is not performed (No at step S13), the determiner 44 determines the version of the first data to a version indicating the new registration (step S15).

Subsequently, the distributing unit 45 transmits the (pieces of) second data based on the first data and the information indicating the version of the first data to the transmission destination device(s) selected through the selection screen displayed at step S9 using the plug-in(s) (step S16). The distributing unit 45 then stores the history information 52 for each job (step S17).

Figure 16:
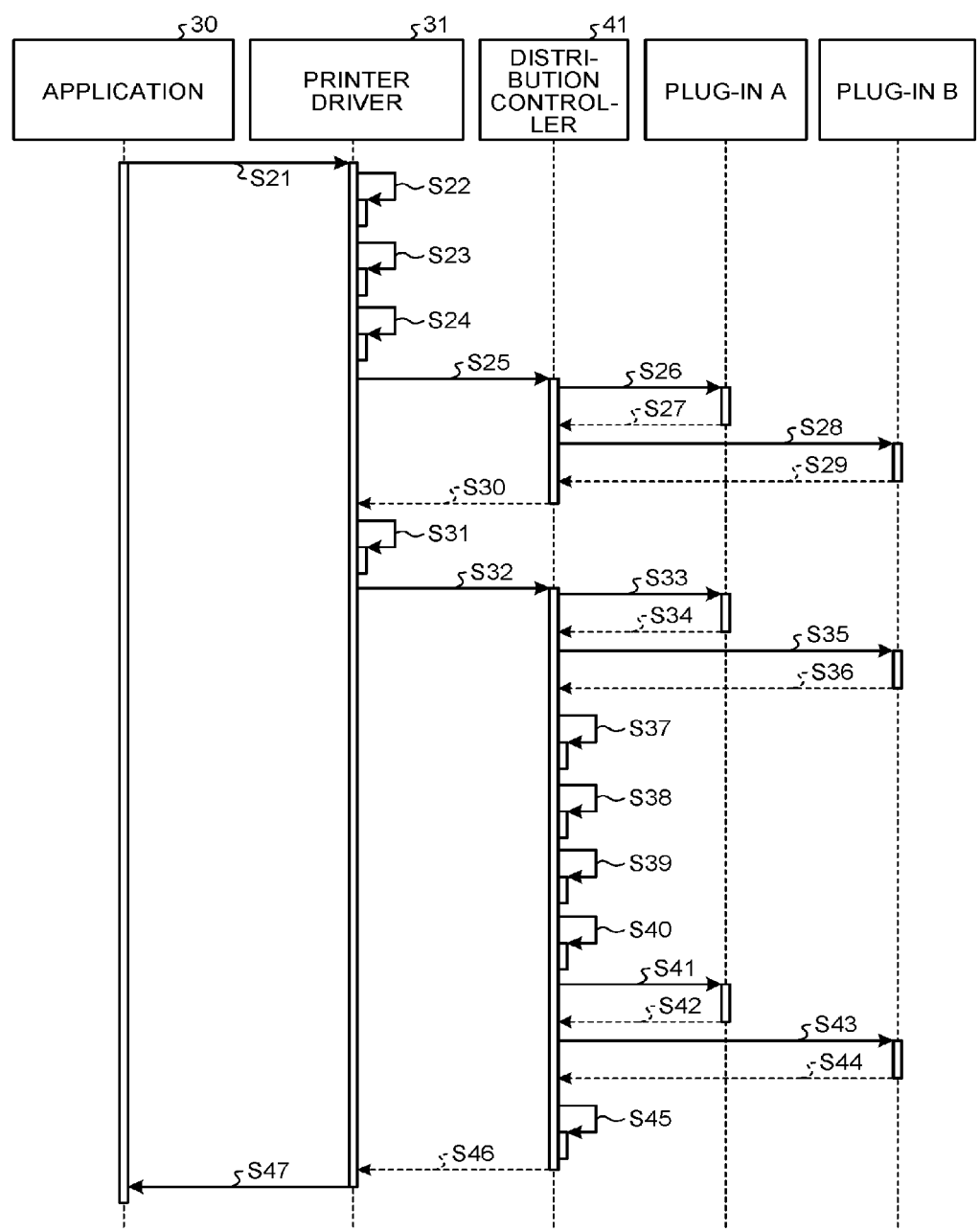
FIG. 16 is a diagram illustrating an example of sequence of the information distribution method in the first embodiment.

Next, sequence of the information distribution method in the first embodiment will be described. FIG. 16 is a diagram illustrating an example of the sequence of the information distribution method in the first embodiment. First, the application 30 transmits the printing (digitization) request containing the first data to the printer driver 31 (receiver 32) (step S21). Then, the printer driver 31 (display controller 33) causes display of the printing (digitization) setting screen (see FIG. 4) on the display device 17 (step S22). Subsequently, the printer driver 31 (generator 34) generates a job for printing (digitizing) the first data based on the printing setting data specified by the user through the printing (digitization) setting screen (step S23). After that, the printer driver 31 (extracting unit 36) extracts the above-mentioned characteristic information indicating the characteristics of the first data based on the printing setting data (step S24).

Thereafter, the printer driver 31 (converter 37) inquires at the distribution controller 41 (acquiring unit 42) about the (pieces of) data format information 53 (step S25).

The distribution controller 41 (acquiring unit 42) specifies the valid plug-in(s) with reference to the plug-in information 51. The valid plug-ins are assumed to be the plug-in A and the plug-in B in this example. Then, the distribution controller 41 (acquiring unit 42) inquires at the plug-in A about the data format information 53a (step S26). Subsequently, the plug-in A returns information indicating the PDF format as the data format information 53a, to the distribution controller 41 (acquiring unit 42) (step S27). In the same manner, the distribution controller 41 (acquiring unit 42) inquires at the plug-in B about the data format information 53b (step S28). Subsequently, the plug-in B returns pieces of information indicating the PDF format and the JPEG format as the data format information 53b, to the distribution controller 41 (acquiring unit 42) (step S29).

Then, the distribution controller 41 (acquiring unit 42) returns the pieces of information indicating the PDF format and the JPEG format as the pieces of data format information 53, to the printer driver 31 (converter 37) (step S30). The printer driver 31 (converter 37) converts the first data into the pieces of second data in the image formats (the PDF format and the JPEG format) indicated by the pieces of data format information 53 received from the distribution controller 41 (acquiring unit 42) based on the printing setting data (step S31). Subsequently, the printer driver 31 (converter 37) transmits the pieces of second data to the distribution controller 41 (distributing unit 45) (step S32).

The distribution controller 41 (acquiring unit 42) then inquires at the plug-in A about the address specification information 54a (step S33). The plug-in A returns the address specification information 54a held by itself to the distribution controller 41 (acquiring unit 42) (step S34). In the same manner, the distribution controller 41 (acquiring unit 42) inquires at the plug-in B about the address specification information 54b (step S35). The plug-in B returns the address specification information 54b held by itself to the distribution controller 41 (acquiring unit 42) (step S36).

Thereafter, the distribution controller 41 (display controller 43) causes display of the selection screens (see FIG. 8 and FIG. 9) for selecting the transmission destination device on the display device 17 based on the pieces of address specification information 54 received at step S34 and step S36 and receives operation input indicating one or more transmission destination devices from the user (step S37). In this example, the distribution controller 41 (display controller 43) is assumed to receive operation input of selecting the server device 200b (transmission destination device contained in the address specification information 54a of the plug-in A) for the conference system and the smart device 200a (transmission destination device contained in the address specification information 54b of the plug-in B).

Then, the distribution controller 41 (determiner 44) acquires the difference between the characteristic information that the data of the history information 52 has and the characteristic information extracted by the extracting unit 36 at step S24 (step S38).

The distribution controller 41 (determiner 44) determines whether the first data is updated data of first data that has been already transmitted, using the above-mentioned determination criterion (step S39). In this example, for the server device 200b (the transmission destination device contained in the address specification information 54a of the plug-in A) for the conference system, the first data is assumed to be determined as the updated data of the first data that has been already transmitted once. On the other hand, for the smart device 200a (the transmission destination device contained in the address specification information 54b of the plug-in B), the first data is assumed to be determined as the first data that is transmitted for the first time. In this case, the distribution controller 41 (display controller 43) may cause display of the confirmation screen (see FIG. 10) on the display device 17 and receive operation input indicating the new registration or the overwriting registration from the user.

Then, the distribution controller 41 (determiner 44) determines registration information to transmit to the server device 200b (the transmission destination device contained in the address specification information 54a of the plug-in A) for the conference system to be information indicating the overwriting information and determines registration information to transmit to the smart device 200a (the transmission destination device contained in the address specification information 54b of the plug-in B) to be information indicating the new registration (step S40).

Thereafter, the distribution controller 41 (distributing unit 45) transmits the second data in the PDF format, the registration information (overwriting registration) determined at step S40, and the version information (V1.1) to the transmission destination device (server device 200b) using the plug-in A storing therein the address specification information 54a (the address of the server device 200b) (step S41). The plug-in A returns transmission result information indicating a transmission result (success or failure) to the distribution controller 41 (distributing unit 45) (step S42). In the same manner, the distribution controller 41 (distributing unit 45) transmits the second data in the PDF format, the second data in the JPEG format, the registration information (new registration) determined at step S40, and the version information (V1.1) to the transmission destination device (smart device 200a) using the plug-in B storing therein the address specification information 54b (the address of the smart device 200a) (step S43). The plug-in B returns transmission result information indicating a transmission result (success or failure) to the distribution controller 41 (distributing unit 45) (step S44).

Subsequently, the distribution controller 41 (distributing unit 45) stores the above-mentioned history information 52 for each job (step S45).

Then, the distribution controller 41 (distributing unit 45) returns the pieces of transmission result information to the printer driver 31 (step S46). The printer driver 31 then returns the pieces of transmission result information to the application 30 (step S47).

As described above, in the information distribution system 400 (information processing device 100) in the first embodiment, the determiner 44 determines whether the first data relates to the first data which is the conversion source of the one or more pieces of second data that have been already transmitted and determines the version information of the first data. Furthermore, the information distribution system 400 (information processing device 100) in the first embodiment includes one or more plug-ins each storing the data format information 53 indicating one or more image data formats that can be used and the one or more pieces of address specification information 54 for each type of devices and communicating with the devices.

With the above-described configuration, the information distribution system 400 (information processing device 100) in the first embodiment can transmit data to various devices including a printer by a unified operation with a printing operation without causing the user to be conscious of a usable data format and manage a version of the data.

Second Embodiment

Next, a second embodiment will be described. An information processing device 100 in the second embodiment is different from the information processing device 100 in the first embodiment in that it further includes a specifying unit 38. In the description of the second embodiment, similar description to that of the first embodiment is omitted and different parts from the first embodiment will be described.

Figure 17:
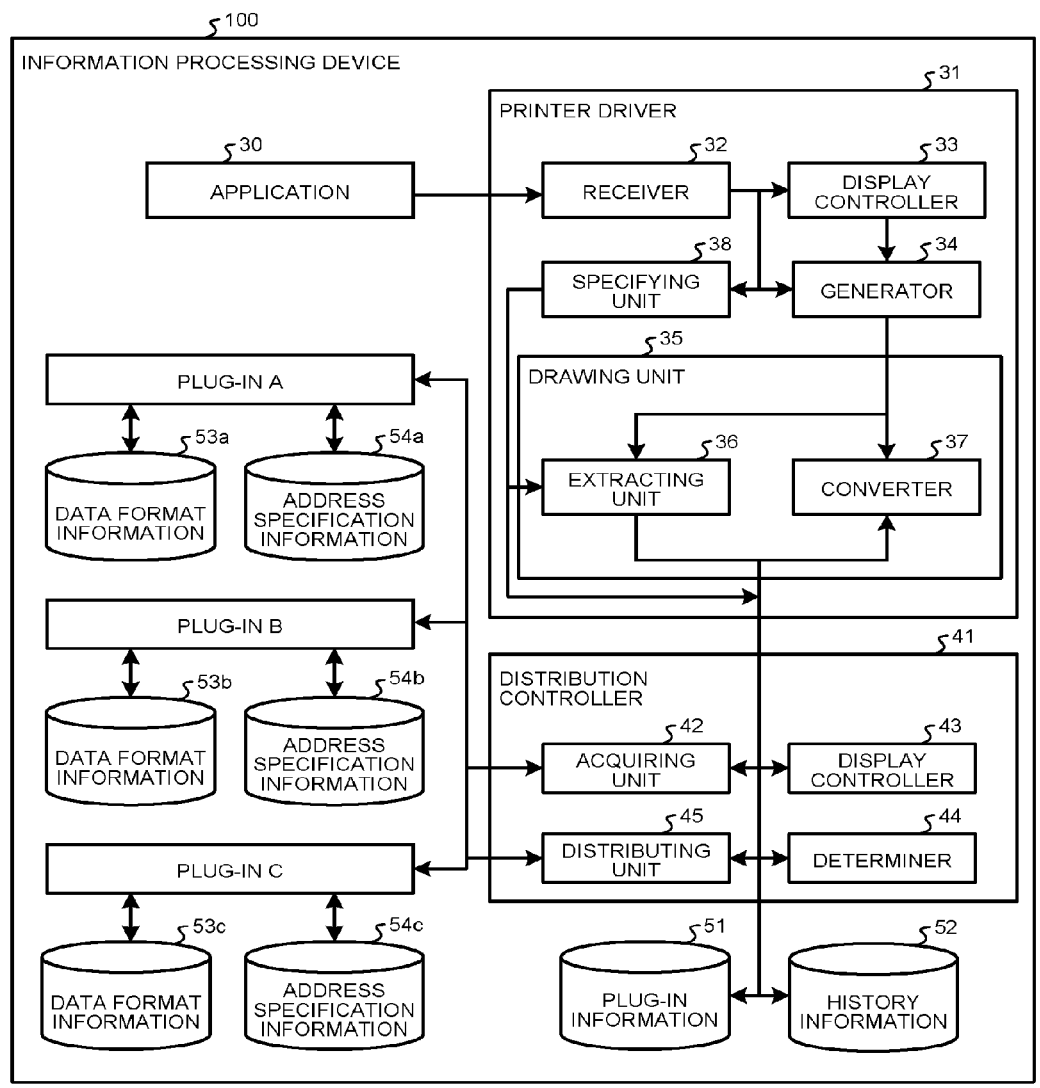
FIG. 17 is a diagram illustrating an example of functional blocks of an information processing device according to a second embodiment.

FIG. 17 is a diagram illustrating an example of functional blocks of the information processing device 100 in the second embodiment. The information processing device 100 in the second embodiment includes the application 30, the printer driver 31, the distribution controller 41, and the plug-ins (the plug-in A, the plug-in B, and the plug-in C). The printer driver 31 includes the receiver 32, the display controller 33, the generator 34, the drawing unit 35, and the specifying unit 38. The drawing unit 35 includes the extracting unit 36 and the converter 37. The information processing device 100 stores therein the plug-in information 51, the history information 52, the pieces of data format information 53a to 53c, and the pieces of address specification information 54a to 54c.

When the receiver 32 receives a printing (digitization) request containing first data, from the application 30, it inputs the printing (digitization) request to the display controller 33, the generator 34, and the specifying unit 38. The display controller 33 and the generator 34 are the same as those in the first embodiment and description thereof is therefore omitted.

When the specifying unit 38 receives the printing (digitization) request from the receiver 32, it specifies application data having the first data contained in the printing (digitization) request. To be specific, when a job name specified by the printing (digitization) request includes a name (file name) of the application data, the specifying unit 38 retrieves the application data that the application 30 of the information processing device 100 opens using the name of the application data. For example, when the job name specified by the printing (digitization) request includes extension, the specifying unit 38 determines that the job name includes the name of the application data.

The specifying unit 38 specifies whether the application data is newly created data by acquiring the creation date and time and the updating date and time of the application data from setting information (property information) of the application data. When the application 30 has a function of managing version information, the specifying unit 38 acquires the version information from the setting information of the application data. When the application 30 is Microsoft (registered trademark) Word, for example, the specifying unit 38 acquires a revision number indicating a version number as the version information.

Figure 18A:
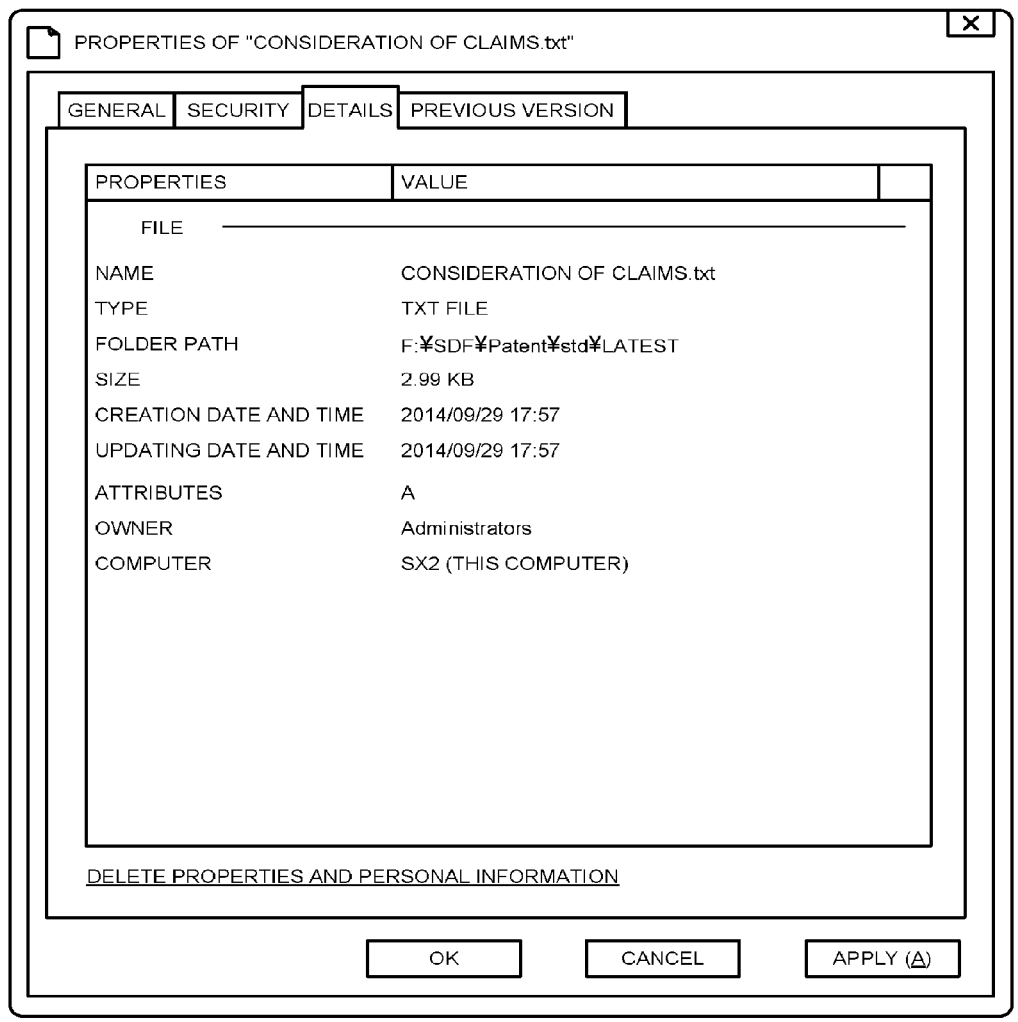
FIG. 18A is a diagram illustrating a first example of setting information in the second embodiment.

FIG. 18A is a diagram illustrating a first example of the setting information in the second embodiment. In the example of FIG. 18A, the creation date and time and the updating date and time are the same (2014/09/29 17:57). That is to say, the application data that has the setting information in FIG. 18A is newly created in this example.

Figure 18B:
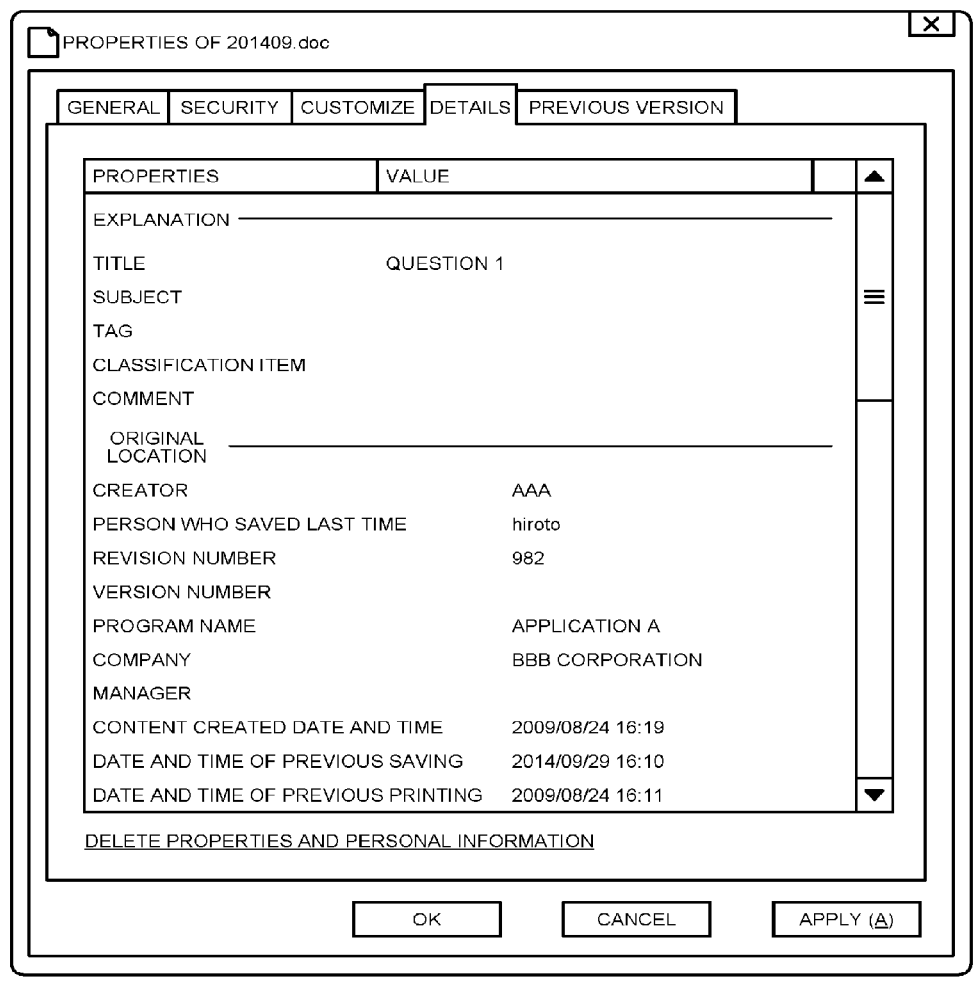
FIG. 18B is a diagram illustrating a second example of the setting information in the second embodiment.

FIG. 18B is a diagram illustrating a second example of the setting information in the second embodiment. In the example of FIG. 18B, the setting information contains a revision number. In the example of FIG. 18B, the revision number is 982. The specifying unit 38 acquires the revision number as a version of the application data.

Referring back to FIG. 17, when the specifying unit 38 has been able to acquire the revision number, it inputs the revision number to the determiner 44. When the determiner 44 receives the revision number from the specifying unit 38, it determines the revision number to be the version information of the first data. When the specifying unit 38 has not been able to acquire the revision number, it inputs a request the extracting unit 36 to execute extraction processing of characteristic information. Operations when the extracting unit 36 has received, from the specifying unit 38, the request to execute the extraction processing of the characteristic information are the same as those in the first embodiment and description thereof is therefore omitted.

Next, an example of a version determination method in the second embodiment will be described.

Figure 19:
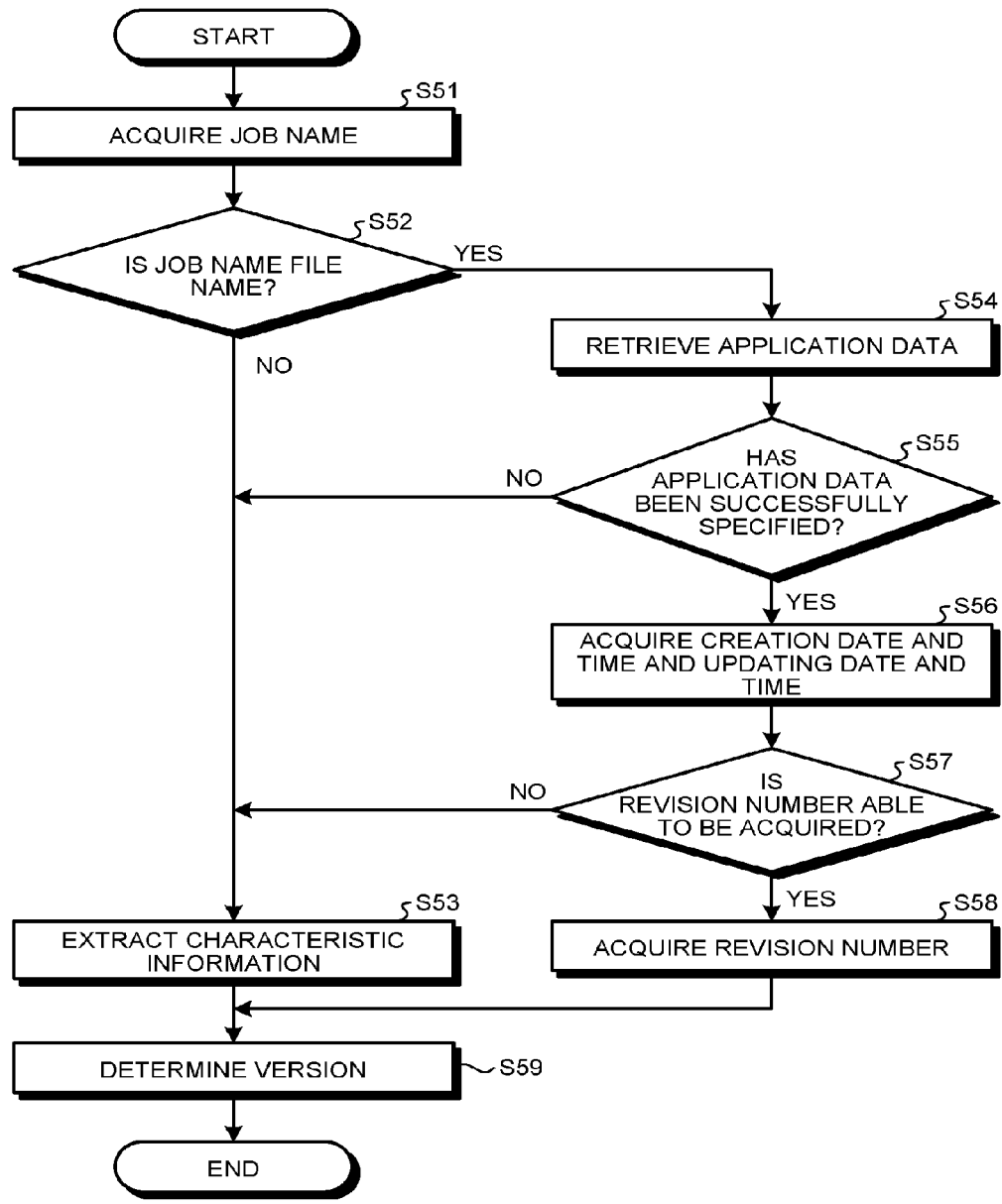
FIG. 19 is a flowchart illustrating an example of a version determination method in the second embodiment.

FIG. 19 is a flowchart illustrating an example of the version determination method in the second embodiment. First, the specifying unit 38 acquires a job name contained in the printing (digitization) request (step S51). Then, the specifying unit 38 determines whether the job name includes the name (file name) of the application data (step S52).

When the job name does not include the file name (No at step S52), the extracting unit 36 extracts the characteristic information indicating the characteristics of the first data based on the above-mentioned printing setting data (step S53).

When the job name includes the file name (Yes at step S52), the specifying unit 38 retrieves the application data that the application 30 of the information processing device 100 opens using the file name (step S54). When the specifying unit 38 has not successfully specified the application data (No at step S55), the process proceeds to step S53.

When the specifying unit 38 has successfully specified the application data (Yes at step S55), the specifying unit 38 acquires the creation date and time and the updating date and time of the application data from the setting information (property information) of the application data (step S56). Then, the specifying unit 38 determines whether the specified application data is the application data from which the revision number is capable of being acquired (step S57). When the revision number cannot be acquired (No at step S57), the process proceeds to step S53. When the revision number can be acquired (Yes at step S57), the specifying unit 38 acquires the revision number from the setting information of the application data (step S58).

Subsequently, the determiner 44 determines the version of the first data (step S59). To be specific, when the revision number has been able to be acquired, the determiner 44 determines the revision number to be the version of the first data. When the revision number has not been able to be acquired, the determiner 44 determines the version of the first data based on the characteristic information. In this case, if the determiner 44 has been able to acquire the creation date and time and the updating date and time, it determines the version of the first data based on the characteristic information, the creation date and time, and the updating date and time.

The display controller 43 may cause display of the confirmation screens (see FIG. 10 or FIG. 11) for enabling the user to confirm change of the version information before the determiner 44 determines to change the version information.

As described above, in the information distribution system 400 (information processing device 100) in the second embodiment, the specifying unit 38 specifies the application data containing the first data. When the specifying unit 38 has specified the application data, the determiner 44 changes the version information of the first data based on the setting information (property information) indicating settings of the application data.

With the above-described configuration, just as in the same manner as in the first embodiment, the information distribution system 400 (information processing device 100) in the second embodiment can transmit the data to various devices including a printer by a unified operation with a printing operation without causing the user to be conscious of a usable data format and manage a version of the data.

Supplemental Description of First and Second Embodiments

In the above-mentioned first and second embodiments, the printer driver 31 and the distribution controller 41 are configured as separate functional blocks. Alternatively, the distribution controller 41 may be configured as a functional block in the printer driver 31.

The distribution controller 41 may be installed in the information processing device 100 simultaneously with installation of the printer driver 31 therein or the distribution controller 41 may be installed in the information processing device 100 independently of the installation of the printer driver 31 therein.

When the distribution controller 41 is installed in the information processing device 100 independently of the installation of the printer driver 31 therein, updating and uninstallation of the distribution controller 41 can be performed freely.

On the other hand, when the distribution controller 41 is included in a package of the printer driver 31, there is an effect that the distribution controller 41 can be installed with Point&Print (registered trademark) in the same manner as in stand-alone.

The Point&Print (registered trademark) will be described below. The Point&Print (registered trademark) is a mode in which client computers perform printing directed to a network printer using a host computer as a print server in a system including the printer, the host computer, and the client computers that are connected to a network. In such a system, the client computers need to install the same printer driver as that in the host computer. Installation of the printer driver in the individual client computers on the network involves a high cost. As means for solving this problem, the Point&Print (registered trademark) has a mechanism of downloading and installing the printer driver in the client computers from the host computer. The printer driver that has installed the Point&Print (registered trademark) therein can switch between performing drawing processing either in the client computers or in the host computer. A case in which the client computers perform the drawing processing is referred to as "client-side rendering". A case in which the host computer performs the drawing processing is referred to as "server-side rendering". The printer driver that has installed the Point&Print (registered trademark) therein is classified into a RAW spool format and an EMF spool format.

The distribution controller 41 may be operated as one application of the information processing device 100 or may be operated as one OS service of the information processing device 100. Alternatively, the distribution controller 41 may be operated by an external device capable of communicating with the information processing device 100.

The plug-ins of the distribution controller 41 may be installed in the same path as a computer program file executing the distribution controller 41. The above-mentioned first and second embodiments employ a method in which the devices 200 as the candidates of the transmission destinations to which the distribution controller 41 transmits the (pieces of) second data are previously registered as the pieces of address specification information for the respective plug-ins statically. Alternatively, the distribution controller 41 may seek out the devices 200 being the candidates of the transmission destinations by searching (discovering) the network dynamically.

The computer program that is executed by the information processing device 100 is recorded in a computer-readable recording medium such as a compact disc read only memory (CD-ROM), a memory card, a compact disc recordable (CD-R), and a digital versatile disc (DVD), as an installable or executable file, and provided as a computer program product.

The computer program that is executed by the information processing device 100 may be stored in a computer connected to a network such as the Internet and provided by being downloaded via the network. Furthermore, the computer program that is executed by the information processing device 100 may be provided via a network such as the Internet without being downloaded.

The computer program for the information processing device 100 may be embedded and provided in the ROM 12, for example.

The computer program that is executed by the information processing device 100 has a module configuration including the above-mentioned respective functional blocks. As pieces of actual hardware, the respective functional blocks are loaded on the RAM 13 when the CPU 11 reads and executes the computer program from a storage medium such as the storage device 18. That is to say, the above-mentioned respective functional blocks are generated on the RAM 13.

Some or all of the above-mentioned respective functional blocks of the information processing device 100 may be implemented by hardware such as an integrated circuit (IC) and not by software.

The present invention provides an effect that data can be transmitted to various devices including a printer by a unified operation with a printing operation without causing the user to be conscious of a usable data format and a version of the data can be managed.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information distribution system that distributes information to devices of a plurality of types, the information distribution system comprising:
   a reception unit configured to receive first data from an application;
   a plurality of plug-ins
      respectively correspond to the plurality of types of the devices, and
      configured to control storage of data format information indicating one or more data formats capable of being used by the devices and storage of one or more pieces of address specification information indicating addresses of the devices, and to transmit, to one or more devices, one or more pieces of second data obtained by converting a data format of the first data;
   an acquisition unit configured to acquire, from one or more of the plug-ins, the address specification information and the data format information;
   a display control unit configured to perform control to display, on a display device, a selection screen for receiving selection of one or more pieces of address specification information from among the one or more pieces of address specification information acquired by the acquisition unit;
   a determination unit configured to determine, for each of the one or more devices specified by the one or more pieces of selected address specification information, whether the first data relates to the first data which is a conversion source of the one or more pieces of second data that have been already transmitted; and
   a distribution unit configured to transmit the one or more pieces of second data each obtained by conversion into a data format specified by the data format information acquired by the acquisition unit and information for identifying whether the first data which is a conversion source of the one or more pieces of second data relates to the first data which is the conversion source of the one or more pieces of second data that have been already transmitted to the one or more devices specified by the one or more pieces of address specification information received through the selection screen using the plug-ins.

2. The information distribution system according to claim 1, further comprising:
   an extraction unit configured to extract characteristic information indicating characteristics of the first data; and
   a first storage unit configured to store history information in which transmission dates and times of pieces of transmitted second data which are the one or more pieces of second data that have been already transmitted, a transmission destination devices of the pieces of transmitted second data, and the characteristic information of the first data which is the conversion source of the pieces of transmitted second data are associated with each other, wherein the determination unit determines version information of the first data which is the conversion source of the one or more pieces of second data to be transmitted based on difference between the characteristic information of the first data extracted by the extraction unit and the characteristic information contained in the history information.

3. The information distribution system according to claim 2, wherein the characteristic information contains information specifying a drawing object.

4. The information distribution system according to claim 2, wherein the determination unit changes the version information of the first data when the data amount indicating the difference in the characteristic information is larger than 0 and is equal to or smaller than a threshold.

5. The information distribution system according to claim 2, further comprising a specification unit configured to specify application data containing the first data, wherein the determination unit changes the version information of the first data based on setting information indicating settings of the application data.

6. The information distribution system according to claim 5, wherein the setting information contains at least one of creation date and time of the first data, updating date and time of the first data, and a revision number indicating a version number of the application data.

7. The information distribution system according to claim 2, wherein the display control unit performs control to display, on a display device, a confirmation screen for causing a user to confirm change of the version information before the determination unit determines to change the version information of the first data, and the determination unit determines to change the version information when the determination unit receives input indicating change of the version information through the confirmation screen.

8. The information distribution system according to claim 1, further comprising a conversion unit configured to convert the first data into the one or more pieces of second data based on the pieces of data format information acquired by the acquisition unit.

9. The information distribution system according to claim 8, wherein an extraction unit extracts the characteristic information from the first data before the conversion unit converts the first data into the one or more pieces of second data based on the pieces of data format information acquired by the acquisition unit.

10. The information distribution system according to claim 8, wherein the conversion unit is a printer driver.

11. The information distribution system according to claim 1, further comprising a second storage unit configured to store plug-in information indicating whether the plug-in is valid, wherein the acquisition unit acquires the address specification information from the one or more valid plug-ins specified based on the plug-in information, and the acquisition unit acquires the pieces of data format information from the one or more valid plug-ins specified based on the plug-in information.

12. The information distribution system according to claim 1, wherein the types of the devices include at least one of a printing device, a smart device, and a server device.

13. An information processing device that distributes information to devices of a plurality of types, the information processing device comprising:

a reception unit configured to receive first data from an application;

a plurality of plug-ins respectively correspond to the plurality of types of the devices, and configured to control storage of data format information indicating one or more data formats capable of being used by the devices and storage of one or more pieces of address specification information indicating addresses of the devices, and to transmit, to one or more devices, one or more pieces of second data obtained by converting a data format of the first data, the plug-ins corresponding to each of the types of the devices;

an acquisition unit configured to acquire, from one or more of the plug-ins, the address specification information and the data format information;

a display control unit configured to perform control to display, on a display device, a selection screen for receiving selection of one or more pieces of address specification information from among the one or more pieces of address specification information acquired by the acquisition unit;

a determination unit configured to determine, for each of the one or more devices specified by the one or more pieces of selected address specification information, whether the first data relates to the first data which is a conversion source of the one or more pieces of second data that have been already transmitted; and a distribution unit configured to transmit the one or more pieces of second data each obtained by conversion into a data format specified by the data format information acquired by the acquisition unit and information for identifying whether the first data which is a conversion source of the one or more pieces of second data relates to the first data which is the conversion source of the one or more pieces of second data that have been already transmitted to the one or more devices specified by the one or more pieces of address specification information received through the selection screen using the plug-ins.

14. An information distribution method performed in an information distribution system that distributes information to devices of a plurality of types, the method comprising:

receiving, by a reception unit, first data from an application;

controlling, by each of a plurality of plug-ins respectively corresponding to the types of the devices, storage of data format information indicating one or more data formats capable of being used by the devices and storage of one or more pieces of address specification information indicating addresses of the devices, and transmitting, to one or more device, one or more pieces of second data formed by converting a data format of the first data;

acquiring, by an acquisition unit, the address specification information and the data format information from one or more plug-ins;

performing, by a display control unit, control to display, on a display device, a selection screen for receiving selection of one or more pieces of address specification information from among the one or more pieces of address specification information acquired by the acquisition unit;

determining, by a determination unit, for each of the one or more devices specified by the one or more pieces of selected address specification information, whether the first data relates to the first data which is a conversion source of the one or more pieces of second data that have been already transmitted; and transmitting, by a distribution unit, the one or more pieces of second data obtained by conversion into a data format specified by the data format information acquired by the acquisition unit and information for identifying whether the first data which is a conversion source of the one or more pieces of second data relates to the first data which is the conversion source of the one or more pieces of second data that have been already transmitted to the one or more devices specified by the one or more pieces of address specification information received through the selection screen using the plug-ins.

\* \* \* \* \*